Figure 1:
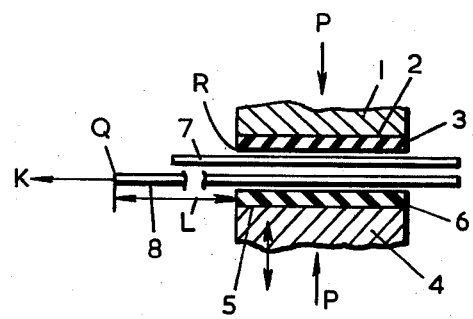

United States Patent [19]
Pezarro

[11] 3,970,491
[45] July 20, 1976

[54] METHOD FOR MUTUALLY CONNECTING TWO STRIPS OF A THERMOPLASTIC MATERIAL

[75] Inventor: Salomon Pezarro, Pijnacker, Netherlands

[73] Assignee: N.V. Technische Maatschappij Marchand-Andriessen, Rijswijk, Netherlands

[22] Filed: Dec. 19, 1974

[21] Appl. No.: 535,046

[30] Foreign Application Priority Data
Dec. 21, 1973  Netherlands.................... 7317632

[52] U.S. Cl. ............................. 156/73.5; 53/198 B; 156/306; 264/68
[51] Int. Cl.² ..................................... B32B 31/20
[58] Field of Search ................ 53/198 B; 156/73.5, 156/309, 306; 264/68

[56] References Cited
UNITED STATES PATENTS

| | | | |
|---|---|---|---|
| 3,442,734 | 5/1969 | Ericsson............................ | 156/73.5 |
| 3,442,735 | 5/1969 | Stensaker.......................... | 156/73.5 |
| 3,554,845 | 1/1971 | Billett et al. ...................... | 156/73.5 |
| 3,873,387 | 3/1975 | Schoening......................... | 156/73.5 |

Primary Examiner—Edward G. Whitby
Attorney, Agent, or Firm—Barnes, Kisselle, Raisch & Choate

[57] ABSTRACT

Two thermoplastic strips are weld together frictionally by positioning the ends of the strips together in overlapping relation. A third strip of thermoplastic is interposed between the overlapping strips. Gripping the ends of the two overlapping strips so as to maintain them stationary while moving the third strip rapidly in a direction longitudinally of said two strips until the third strip is removed from between the two overlapping strips.

4 Claims, 4 Drawing Figures

METHOD FOR MUTUALLY CONNECTING TWO STRIPS OF A THERMOPLASTIC MATERIAL

The present invention relates to a method for mutually connecting two strips of a thermoplastic material, to be arranged adjacent to each other with facing surfaces.

Various methods for accomplishing of a mutual connection between like strips are known, in which a separate attaching or welding material is used in the connection, a cumbrous installation for accomplishing said connection is required, or in which the connection, at the loading on shear, appearing during use, does not appear reliable all the time.

The present invention, with a method as described in the preamble, aims at providing a connection which, besides the required reliability, does not or almost not require use of additional material, may be realized quickly and in a simple way. For this purpose, with the method according to the present invention, the strips are held pressed with a given force on each other at the overlap, at least one of the strips being held stationary and the connection being accomplished by frictional heat, stimulated during a single shifting by a tractive force, to be exerted stroke-wise on the strip to be shifted, at a location which is a given strip-length remote from the overlap. With the method according to the invention the connection between the strips is thus accomplished by local fusing together of he strips themselves, merely by stimulated frictional heat and under exerting of pressure.

With a further method, in which the strips are formed by strap ends, for instance of a strap-loop to be wound around a package and one of said strap end is held stationary, according to the present invention the stroke-wise tractive force is exerted on the other strap end. Said other strap may then be fed advantageously from the supply reel of a packaging machine.

Preferably, with last mentioned method according to the present invention, the said surface, exerting pressure and contacting the strap end to be moved, consists of a material having a relatively small coefficient of friction, for instance polytetrafluorethylene, to facilitate the displacement under pressure load of the strap end to be shifted between the pressing surface and the strap end, held stationary.

With another method, in which the strips are formed by strap ends, for instance of a strap-loop to be wound around a package, both strap ends being held stationary, according to the present invention, prior to the strap ends being pressed on each other, a separate strap portion of a similar thermoplastic material as the strap ends to be connected, is arranged between said strap ends and the separate strap portion is totally removed from the overlap by exerting said stroke-wide tractive force. The strap portion, to be separately applied, is in this case hardly subject to wear and is adapted to be applied a large number of times for accomplishment of the required frictional heat.

Preferably, in the preceding methods according to the present invention, the surface exerting pressure, contacting a strap end to be held stationary, consists of a material having a relatively large coefficient of friction, for instance rubber.

In case the strap ends consist of an extended polypropylene, having a width of 5 mm and a thickness of 0.3 mm, with the method according to the present invention, in which the fusing heat is obtained by mutual friction of the strap ends themselves, with a length of the overlap of for instance 3 cm, a force at right angles of 140–160 kg and a stroke-wise tractive force on the strap ends to be shifted of 30 kg, the said strap length between the point of application of said tractive force and the initial point of said overlap amounts to 20–25 cm, for obtaining an optimal strength of the weld. With "length" is meant here the length along which the synthetic material is fused together.

The present invention comprises also a weld between two strips, or strap portions of a thermoplastic material, accomplished according to one of the preceding methods.

Figure 2:
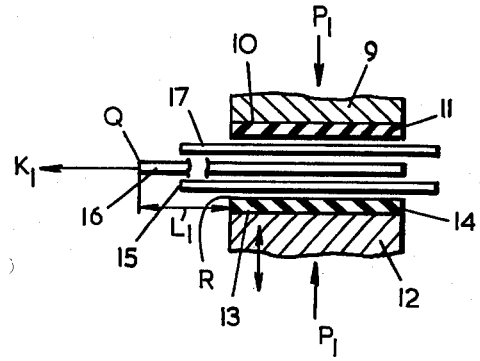
Figure 4:
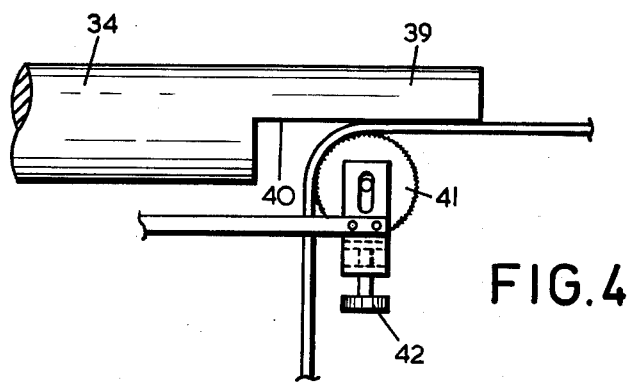
Figure 3:
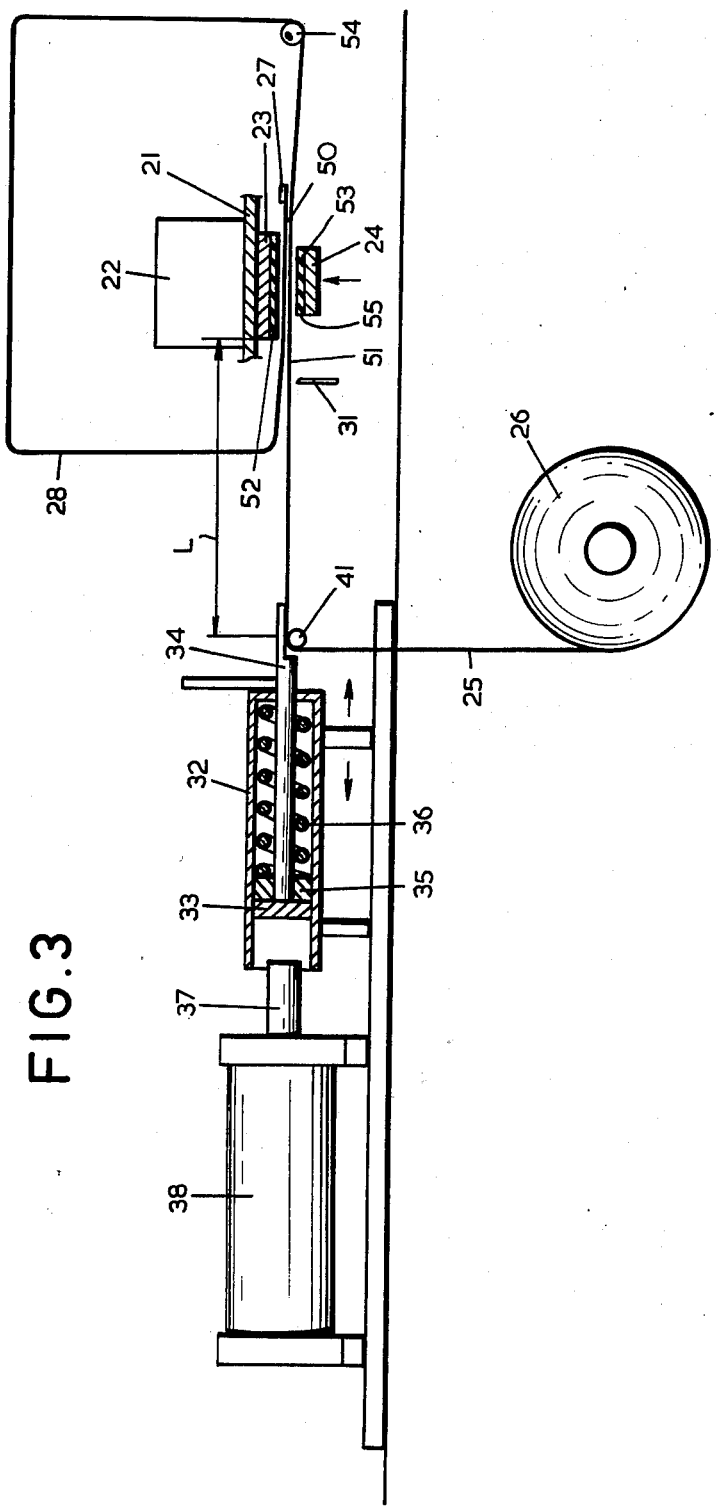

The present invention will now be elucidated with reference to several embodiments, shown schematically in the drawing, in which:

FIG. 1 shows the principle of the connecting method in which merely both strap ends to be connected are present, FIG. 2 shows the principle of the connecting method in which, besides both strap ends to be connected, still a separate strap portion is used, FIG. 3 is a vertical section along the plane of drawing, in which a prototype of a device for carrying out the method according to the principle shown in FIG. 1, has been shown schematically, and FIG. 4 shows a detail of the draw bar.

As appears from FIG. 1, a supporting member 1, having a horizontal lower surface 2, provided with a strip 3 of rubber or like material, having a large coefficient of friction, has been arranged fixed over a pressure member 4, being vertically reciprocable. Said member 4 has been provided with an upper surface 5, having a strip 6 of polytetrafluorethylene, or like material, having a low coefficient of friction. Both strap ends of thermoplastic material, for instance an extended polypropylene, indicated by 7 and 8, which strap ends are held mutually overlapping in longitudinal direction within the space between the supporting member and the pressure member. The strap end 7, for instance, may — as has not been shown in detail — be fastened at a fixed point and the strap end 8 is then fastened at a point Q which is adapted to be moved in the longitudinal direction of the strap ends.

The pressure member 4 is now pressed upwardly with a given force at right angles P and held in that position, after which — therefore, on maintaining the pressure on the strap ends — once and stroke-wise a tractive force K having a given size, is exerted on the strap end 8. By the frictional heat, stimulated during the shifting movement, the surfaces being pressed on each other, the strap ends 7, 8 are then fused and welded together. Herewith, one should pay attention to the tractive force K will attack the strap end 8 at the edge Q via a given strap length or "extension length" L, extending to the nearby edge R of the overlap, into which will be gone more fully. The strap end 7 is held additionally by the rubber surface at the pressure member 1, whereas the strap end 8 will pass the PTFE-surface at the pressure member 4 practically without friction.

As appears from FIG. 2, a supporting member 9, being provided with a strip 11 of rubber at the horizontal lower surface 10, has been arranged fixed over a vertically reciprocable pressure member 12, however, in this case, the latter has been provided too with a strip 14 of rubber at the horizontal upper surface 13. Both strap ends 17 and 15, of e.g. extended polypropylene, are held mutually overlapping in longitudinal direction within the space between both rubber surfaces, in which however, both strap ends are fixed, e.g. at a stationary point. A separate strap portion 16, for instance also of extended polypropylene, is introduced in longitudinal direction between the strap ends 17, 15 at the overlap and is fixed at a point Q, which is movable in longitudinal direction of the straps.

After the pressure member 12 has been pressed with a given force at right angles $P_1$ towards the supporting member 9 and held in this position, once and strokewise a tractive force $K_1$ is exerted at the strap portion 16, however such, that said strap portion is totally drawn away between the strap ends 17, 15. By the heat, stimulated during the shifting, the opposite surfaces of the strap ends, pressed to each other, are made to fuse and are welded together during the pressure load. Like in the situation shown in FIG. 1, one should pay attention to the tractive force $K_1$ will attack the separate strap portion 16 at the edge Q via a given strap length or "extension length" $L_1$, extending to the near-by edge R of the overlap.

It has namely been found that the distance between the attacking point of the tractive force at the movable strap portion to the near-by edge of the overlap, thus, the strap length or "extension length" L and $L_1$ respectively, will be determining for the appearance of a satisfactory weld. It is assumed that the movable strap portion will first be stretched along the portion L or $L_1$ respectively, during movement of the point Q, during which the two or three respectively, strap portions remain pressed on each other at the overlap by the force at right angles P or $P_1$ respectively, due to the static friction. The moment at which the portion L or $L_1$ respectively, of the movable strap portion has been extended such, that the force corresponding therewith surmounts the static friction, then movement will originate between the strap portions at the overlap and the friction has become dynamic. Since the dynamic coefficient of friction has a considerable lower value than the static coefficient of friction, the movement will continue and, since the movable strap portion has a small mass, said movement will pass very accelerated.

This large velocity of movement is required in order to stimulate the necessary fusing heat at the welding station within the short time available, in order to avoid that said heat has time to discharge to the core of the strap portions. The rubber strips 11, 14 cooperate to hold stationary the contacting strap end.

In FIG. 4, a device has been shown schematically, by means of which a strap of a thermoplastic material, for instance extended polypropylene, having a width of 5 mm and a thickness of 0.3 mm, may be tied in a loop around a package.

A table 21, being lengthwise slotted in the plane of drawing, for supporting a package 22 positioned transverse to and over the said slot, has a supporting plate 23, which is adapted to be moved from a station in which the slot is covered by it from below, to a position, in which the slot is uncovered. To this end said plate 23 has been guided slidingly at the table, for instance from in front of the plane of drawing to behind said plane and backwards. A stamping plate 24, being guided up-and-downwardly movable in the plane of drawing, is adapted to be moved from a position some distance below the supporting plate 23, against said plate 23 and held pressed with an adjustable force at right angles.

A strap 25, of extended polypropylene, spooled on a reel 26, which reel has been arranged below the table 21 and freely aside of the stamping plate 24 and which is rotatable and has been provided with a braking device (not shown), is adapted to be wound with the aid of a carrier member 27, arranged at some distance spaced above the stamping plate 24, in a loop 28 in the plane of drawing around the package 22, to the position shown, in which the strap end 50 will contact the lower surface of the supporting plate, being free from the strap portion 51 and overlapping same partially. Further, a cutting member 31 has been arranged adjacent the strap portion 51 in the direction of feed of the strap 25, at a suitable distance in front of the supporting plate 24.

The above described parts of the device and their operation are generally known and may be found for instance with a package-tieing machine, described in the Dutch patent application No. 73 15495.

The device according to the present invention further comprises a cylindrical vessel 32, being arranged with its axis in the plane of drawing and nearly in line with the lower surface of the supporting plate 23. Within said vessel a piston 33 is movable with small friction, an axially directed draw bar 34, being connected with said piston, protruding through an opening in the bottom of said vessel. In the space between the piston 33 and the bottom of the vessel, a strong spiral spring 36 has been arranged without contacting the wall of the vessel and said bar 34, a padding ring 35 being inserted.

By means of a thrust-rod 37 of an air cylinder 38, arranged in even line with the draw bar 34 and extending through the opening in the vessel 32, the spiral spring 36 can be strained, said strain of the spring being variable by applying padding rings 35, having different axial dimensions.

The draw bar 34 has a semi-cylindrical end portion 39 (vide FIG. 4), against the flat lower surface 40 of which a clamping roller 41 is adapted to be pressed by means of a set screw 42. Thereto said clamping roller 41 has rotatably been supported at the draw bar 34, the axis of rotation of said roller 41 being vertically adjustable.

At first, the strap end 50, reeled from the reel 26, is guided manually over the clamping roller 41 at the draw bar 34, is passed in axial direction of said bar between the supporting plate 24 and the stamping plate 24 and is finally fixed in a clamp (not shown) of the carrier member 27. After having put in operation the driving mechanism of the device, the strap 25 is tied in the loop 28 around the package by the carrier member 27.

In the position shown, the strap end 50 to be fixed is then fixed by the strap clamp at the carrier member 27, whereas by screwing on the clamping screw 42, the movable strap portion 51 is held with a proper pre-tension around the package 22, via the clamping roller 41.

The lower surface of the supporting plate 23 has been provided with a rubber layer 52, whereas the upper surface of the stamping plate 24 has been provided with a layer 53 of PTFE. Further, the strap loop 28 has been guided along a guiding roller 54, which has ex-centrally and rotationally been supported to the table 21, on which will be returned later. The strap length or "extension length" L between the clamping roller 41 and the edge 55 of the stamping plate 24, is adjustable by shifting of the piston-system 32, 33.

OPERATION OF THE DEVICE

After the strap 25, having been laid around the package 22, the stamping plate 24 is moved, from the position shown, upwardly, after which the strap portions 50, 51, overlapping each other, are held pressed with a given force at right angles P against the supporting plate 23. The spring 36, being pre-stressed to a given force K, is unloaded by means of a pawl mechanism (not shown), due to which the draw bar 34 and therewith the strap portion 51, are once stroke-wise moved and said strap portion 51 is welded to the strap end 50. By means of the excentric roller 54, the tension with which the strap loop 28 has been tied around the package, may now be varied to obtain the desired loop tension.

In measurements, carried out with a device as shown in FIG. 3, in which the adjustment of the spring force K remained the same, namely 30 kg, the length of the overlap was for instance 30 mm and the force at right angles P 140–160 kg, for an "extension length" L which varied from 20 to 50 cm, an optimal strength of the weld between the strap ends had been found by loading on shear. The length of the shifting of the movable strap end amounted to 3 cm.

What is claimed is:

1. The method of connecting two strips of thermoplastic material which comprises
    positioning the ends of said strips in overlapping relation,
    interposing a third strip of similar thermoplastic material between the overlapping ends of said two strips,
    applying a pressure force to the outer surfaces of said two strips in a direction transverse to the lengths thereof to force said strips toward one another with said third strip therebetween,
    applying a tractive force longitudinally to said third strip at a point remote from the overlapping ends,
    continuing said gripping force to maintain said ends of said two strips stationary and continuing said tractive force such that the third strip is moved rapidly in a direction longitudinally of said two strips creating heat until said third strip is completely removed from between said two strips and said two strips are fused to one another.

2. The method set forth in claim 1 wherein said gripping force is applied by pads having a large coefficient of friction.

3. The method set forth in claim 1 wherein said ends of said strips comprise a part of a single strip wound around a package.

4. The method set forth in claim 1 in which said ends of said strip comprise polyethylene and the ends are overlapped 3 cm,
    the gripping force ranges between about 140–160 kg and the tractive force is about 30 kg, and the strap length between the point of application of the tractive force and the initial point of overlap ranges between about 20–25 cm for obtaining optimal strength of the weld.

* * * * *

UNITED STATES PATENT OFFICE
CERTIFICATE OF CORRECTION

PATENT NO. : 3,970,491
DATED : July 20, 1976
INVENTOR(S) : Salomon Pezarro

It is certified that error appears in the above-identified patent and that said Letters Patent are hereby corrected as shown below:

Column 1, Line 30 - "he strips" should be "the strips"

Column 1, Line 35 - "end" should be "ends"

Column 1, Line 56 - "stroke-wide" should be "stroke-wise"

Column 2, Line 9 - "length" should be "length of the overlap"

Column 4, Line 48 - "supporting plate 24" should be "supporting plate 23"

Signed and Sealed this

Ninth Day of November 1976

[SEAL]

Attest:

RUTH C. MASON
Attesting Officer

C. MARSHALL DANN
Commissioner of Patents and Trademarks